United States Patent [19]

Akahori et al.

[11] 4,437,095
[45] Mar. 13, 1984

[54] SELECTIVE CALL RECEIVER HAVING TIMED POWER SUPPLY

[75] Inventors: Masaaki Akahori; Takashi Ohyagi, both of Tokyo; Shozo Nishimura, Zushi, all of Japan

[73] Assignees: Nippon Electric Co., Ltd.; Nippon Telegraph & Telephone Public Corporation, both of Tokyo, Japan

[21] Appl. No.: 326,321

[22] Filed: Dec. 1, 1981

[30] Foreign Application Priority Data

Dec. 1, 1980 [JP] Japan ................................. 55-167966

[51] Int. Cl.$^3$ .......................... H04Q 9/14; H04B 1/16; G08B 5/22
[52] U.S. Cl. ........................... 340/825.44; 340/825.48; 455/38
[58] Field of Search ...................... 340/825.44, 825.48, 340/311.1; 179/2 EC, 2 EB; 455/31, 36, 38

[56] References Cited

U.S. PATENT DOCUMENTS

| 4,249,165 | 2/1981 | Mori | 340/825.44 |
| 4,353,065 | 10/1982 | Mori | 340/311.1 |
| 4,369,443 | 1/1983 | Giallanza et al. | 340/825.44 |
| 4,370,753 | 1/1983 | Ehmke | 340/825.48 |

Primary Examiner—Donald J. Yusko
Attorney, Agent, or Firm—Blakely, Sokoloff, Taylor & Zafman

[57] ABSTRACT

A selective call receiver with display is disclosed. The receiver includes a decoder comprised of a reception controller in the form of a dedicated LSI circuit and a display controller in the form of a single chip CPU which, in combination, overcomes inherent weakness in each, namely the relatively large power consumption of a single chip CPU and the difficulty of reconfiguring a dedicated LSI circuit to perform different and/or additional functions.

2 Claims, 3 Drawing Figures

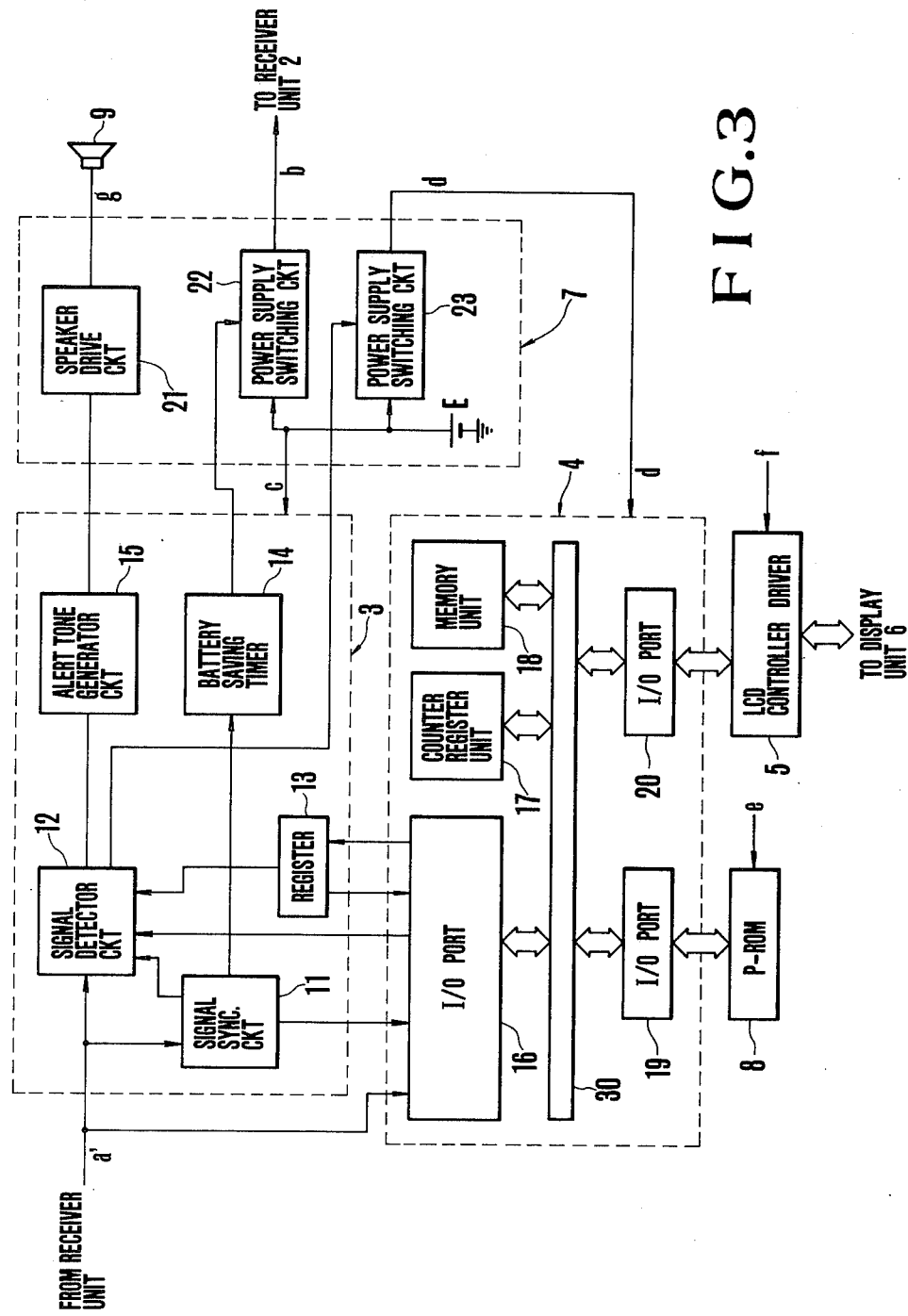

SELECTIVE CALL RECEIVER HAVING TIMED POWER SUPPLY

BACKGROUND OF THE INVENTION

The present invention relates to a selective call receiver with display.

In recent years, many selective call receivers with display have been announced. The display function simply consists of displaying numerical figures. Most of the devices employ a dedicated large scale integrated circuit (LSI) to serve as a decoder. However, in general, large costs and much time are required for developing dedicated LSI's for specific purposes. Further, to change its functions, the LSI must be redesigned. Moreover a single chip LSI has difficulties with incorporating many display functions.

Attempts have been made to eliminate the above-mentioned problems associated with decoder LSI's by constructing the decoder using a single chip central processing unit (CPU). In this case, however, the power supply must be limited to dry cells since the device is a small portable receiver. In other words, the device must be operated on a small power-supply voltage. This causes the processing speed of the CPU to be decreased, and makes it difficult to process the data at high speeds. Therefore, when an operation, such as for error correction, containing many steps is being executed, the alert tone operation is often interrupted for short periods of time. Moreover, size limitations are imposed on the read-only memory (ROM) areas and on the random acess memory (RAM) areas and, hence, the program is limited. This, in other words, imposes limitations on the fundamental functions of the decoder, and makes it difficult to meet the user's requirements. Further, when alpha characters and katakana (square form of kana letters) characters are to be displayed in addition to numerical figures, it will become more difficult to achieve the desired performance from a single chip CPU.

SUMMARY OF THE INVENTION

An object of the present invention therefore is to provide a selective call receiver with display having a LSI decoder whose design can be easily changed, freedom from constrains on the function as a decoder, and minimal power consumption.

In order to accomplish the above-mentioned object, the present invention utilizes a dedicated LSI decoder and a single chip CPU which are so combined as to compensate for the inherent weaknesses of the two devices when used alone to thereby constitute a decoder of a receiver.

According to the present invention, there is provided a selective call receiver with display comprising:

receiver means which receives electromagnetic waves and produces digital received signals;

display means to display received data;

display controller means for controlling said display means;

memory means which stores call numbers;

means responsive to a decoded signal to indicate the paging of the receiver;

reception controller means powered by a power supply, said reception controller means, upon receipt of the digital received signals produced by the receiver means, generating synchronizing pulse signsls and comparing said digital received signals with said call number to provide said decoded signal, said reception controller further generating timing signals for connecting and disconnecting the power supply from said receiver means and said display controller means;

first switching means which controls the connecting and disconnecting of the power supply to said receiver means in response to said timing signals; and second switching means which controls the connecting and disconnecting of the power supply to said display controller means in response to said synchronizing pulse signals.

BRIEF DESCRIPTION OF THE DRAWINGS

FIG. 3 is a block diagram showing details of a reception controller and a display controller.

In FIGS. 1 and 3, thick lines are signal lines for parallel signals and thin lines are signal lines for serial signals.

DESCRIPTION OF PREFERRED EMBODIMENT

Figure 1:
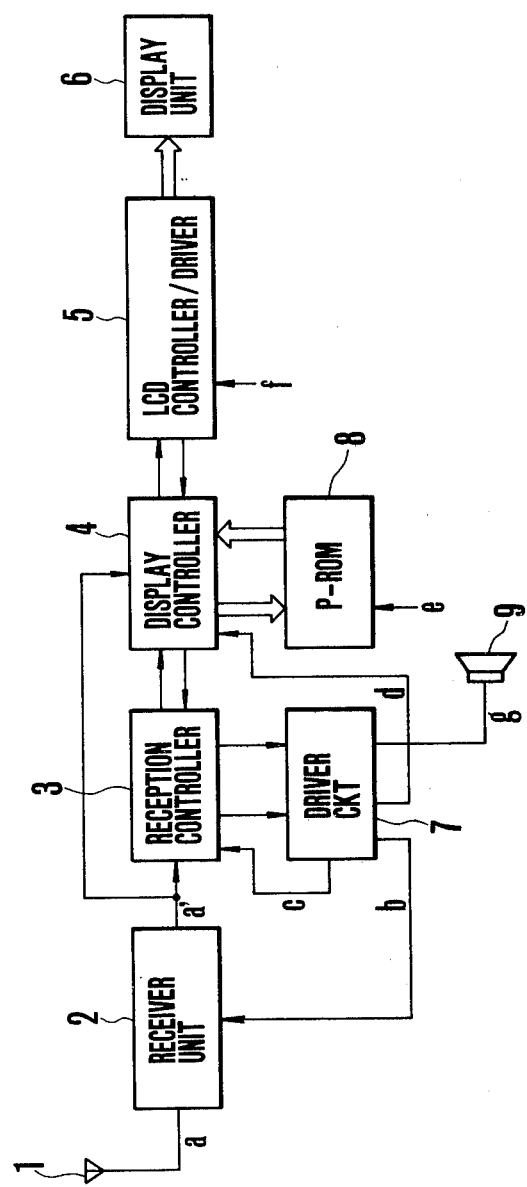
FIG. 1 is a block diagram illustrating an embodiment of the present invention.

FIG. 1 is a block diagram illustrating a selective call receiver with display according to an embodiment of the present invention. First, the individual elements will be described below. There are illustrated a receiving antenna 1 of a receiver, a receiver unit 2 which includes a high-frequency circuit, an intermediate-frequency circuit, a low-frequency circuit and a waveform-shaping circuit and has a function to convert the received high-frequency electromagnetic waves into digital signals, and a reception controller 3 made up of a dedicated LSI and serving to synchronize signals, receive synchronizing signals and selective call signals (selective call codes), and produce call alert tone and timings for saving the battery. The dedicated LSI consists of complementary MOS (CMOS), performs processing in a parallel manner and can, hence, be operated at a low speed (for instance, at 32 kHz) to reduce the consumption of electric power (about 10 $\mu$A). A display controller 4 consists of a CPU of a single chip and functions to receive the data to be displayed, correct errors, control the display driver, and read an external programmable read-only memory (P-ROM). The single-chip CPU is also composed of CMOS, and performs the processing in a serial manner according to a program. Therefore, the single-chip CPU must be operated at high speeds (at several of hundreds of kHz) and consumes the electric power in the order of several of hundreds of microamperes.

An LCD controller/driver 5 functions to display numerical figures or letters on a display unit in response to the signals from the display controller 4. When the numerical figures only are to be displayed, the display controller 4 may contain a LCD controller/driver and, in this case, the separate LCD controller/driver 5 may be eliminated. A display unit 6, when the numerical figures only are to be displayed, consists of a 7-segment LCD (liquid crystal display) with 12 digits and when the letters also are to be displayed, consists of a matrix LCD with 5×7 dots. A driver circuit 7 includes a power-supply means, and functions to drive generation of alert tone and switch the power-supply for battery saving. A P-ROM 8 stores the call numbers of the receiver and the specification of functions of the receiver (as to whether or not the receiver has an automatic reset function and a battery-saving function, etc.). In a system in which the numerical data is received and the numerical code is translated into a sentence and is displayed (hereinafter referred to as key code system), the P-ROM 8 further has a function to store the converted data. A speaker 9 produces the alert tone being driven by the driver 7. The meaning of symbols a to f in FIG. 1 will be described later, as required.

In operation, electromagnetic waves a received through the antenna 1 are subjected in the receiver unit 2 to the frequency conversion, amplification, demodulation and waveform shaping. The resulting digital signals a' are then sent to the reception controller 3. When the power supply is turned on, the reception controller 3 receives the data related to the call number stored in the P-ROM 8 through the display controller 4, and thereafter compares the data (call number of the receiver) with the previously received digital signal to check whether there is call or not. To prevent the contents of RAM from being changed by the static electricity to thereby prevent the reception from being jeopardized, the data of call number is renewed each time a synchronizing signal is received prior to sending the call number. When the call for the receiver of interest is recognized, the display controller 4 is started to receive the display data. Owing to a starting signal from the reception controller 3, the display controller 4 corrects the error as it receives the display data. At the time the error is corrected, in the key code system, a sentence that corresponds to the code of received numerical figure is read from the P-ROM 8 and the result is sent to the LCD controller/driver 5. Responsive to serial data from the display controller 4, the LCD controller/driver 5 directly controls and drives the matrix of 5×7 dots of the subsequent display unit 6. Reception of the call number and display of the display data occur after a predetermined period of time (for instance, about one second) has passed from the moment a group of signals to which the subject receiver pertains had already been sent. Owing to this time lag, reception of the subsequent signals is not adversely affected even when the voltage of the circuit is changed due to heavy current that results from the production of call alert tone.

The battery saving operation will now be described. First, briefly the reception controller 3 which generates clock signals in the block diagram of FIG. 1 is always fed with a current from the power supply. The electric power is supplied to the display controller 4 only at required timings. Furthermore, other circuits, except the P-ROM 8, are fed with the electric power only when they are to be energized.

Figure 2:
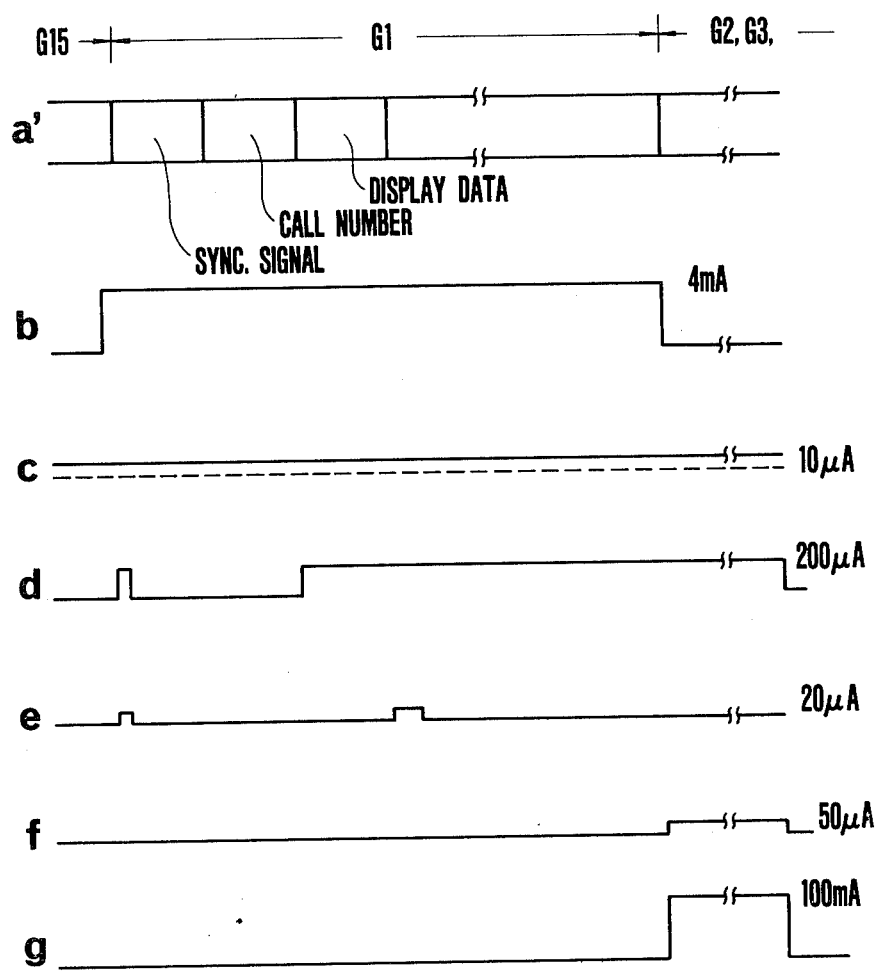
FIG. 2 is a diagram illustrating the conditions of power supply in each of the blocks in FIG. 1.

FIG. 2 is a diagram illustrating the conditions of power supply in each of the blocks in FIG. 1. Referring to FIGS. 1 and 2 in combination, a signal a received through the antenna 1 is converted by the receiver unit 2 into a digital signal a' which is then divided into fifteen groups G1, G2, ... G15. Symbol b represents a power-supply current in the receiver unit 2. The electric power is supplied to the receiver unit 2 only during a period of group G1 in which the call number for the subject receiver is present; i.e., the current is supplied to the receiver unit for about 1.4 seconds to consume a current of 4 mA. By taking into consideration the rising time of the receiver unit 2, the power supply b rises slightly in advance of the call number of the received signal a. The current values will hereinafter be represented by numerical figures, but the height of waveforms has been exaggerated for better understanding. Symbol c represents a power-supply current of the reception controller 3; here, a current of about 10 $\mu$A has been consumed at all times.

Symbol d represents a power-supply current of the display controller 4. The power supply is closed to renew the call number when the synchronizing signal is received, when the call number of the interest receiver is received, and when the subsequent display data is received; a current of 200 $\mu$A flows. However, the time for renewing the call number is very short (several milliseconds), and the subject receiver will be called only several times a day. Therefore, the current of this portion affects very little the life of the battery. According to the conventional art, the display controller 4 had been continuously fed with the current from the power supply.

Symbol e represents a power-supply current of the P-ROM 8. In the case of the key code system, a current of 20 $\mu$A flows when the synchronizing signal is received and when the display data is received to read the data of sentence that is to be converted from the codes of numerical figures. The current e, however, affects very little the life of the battery. If the power supply is connected to the P-ROM 8 at all times, a current of about 10 $\mu$A will be consumed though it varies depending upon the construction of the circuit.

Symbol f represents a power-supply current of the LCD controller/driver 5 and the display unit 6, which flows (about 50 $\mu$A) for 7 to 8 seconds when the call number and the display data are received starting from the moment at which the sending group is finished. The power-supply voltage should be applied simultaneously with the closure of the power supply d. The current f, however, flows for only a very short period of time, and affects the battery life very little. If the power supply is kept connected at all times, a current of about 25 $\mu$A will be consumed continuously. Symbol g denotes a power-supply current of the speaker driver. Since the current may be as large as about 100 mA, an independent switch is used. However, since the total time for driving the speaker per one day is small, the current g does not seriously affect the battery life. Attention, however, should be given to the current capacity of the power supply because the current is very great as compared with other currents. The current g, usually, does not flow unless voice signals are received.

An average current consumption of the thus constructed receiver is calculated below. As mentioned above, the average amount of currents per one day required for the power supply d of display controller, power supply e of P-ROM, power supply f of LCD controller/driver and display unit, and power supply g of speaker driver can be reduced to a degree that can be neglected. Therefore, a current of 4.0 mA of the power supply b of the receiver unit that flows for a period of one group and a current of 0.01 mA of the power supply c of the reception controller which continuously flows for periods of the total of 15 groups, i.e., an average required current I, can be calculated as follows:

$$I = \frac{(4.0 + 0.01) \times 1\,mA + 0.01 \times 14\,mA}{15} \approx 0.28\,mA$$

On the other hand, when the decoder unit is all made up of a CPU like the conventional art, the display controller must be continuously fed with the current d in contrast to the present invention, although the three current suppies e, f and g in average can be reduced to a negligible degree. A total current of about 0.2 mA is required for the current d and the current c that flows into the reception controller. Therefore, the average current I' that is required is calculated as folows:

$$I' = \frac{(4.0 + 0.2) \times 1 \text{ mA} + 0.2 \times 14 \text{ mA}}{15} \approx 0.47 \text{ mA}$$

Thus, it will be understood that the conventional receiver consumes the current in an amount of about twice that of the current consumed by the receiver of the present invention. With the receiver of the present invention, therefore, the life of the battery is nearly twice that of a conventional receiver.

In the above calculations, the power supplies e, f and g are closed at required timings. However, if the power supplies e and f are continuously connected (the power supply g is not continuously connected), the total current of about 35 $\mu$A flows though it may vary depending upon the circuit construction. Consequently, the right terms of the numerators in the above equations representative of I and I' become $0.045 \times 14$ mA and $0.235 \times 14$ mA, respectively, and hence, I=0.31 mA and I'=0.49 mA result. Even in this case, the present invention exhibits superior performance as compared to the conventional art. The relation between the reception controller 3 (dedicated LSI) and the display controller 4 (CPU of a single chip) will now be described. FIG. 3 shows in detail the reception controller and the display controller. The reception controller 3 comprises a signal synchronizing circuit 11 which functions to generate bit-synchronizing pulses and frame-synchronizing pulses from the digital signals a' that are sent from the receiver unit (denoted by 2 in FIG. 1), a signal detector circuit 12 which functions to collate the call number stored in a register 13 with reference to a digital signal sent from the receiver unit 2, the register being adapted to temporarily store the data of call number that is sent through the display controller 4 and that is stored in the P-ROM 8, when the power supply is closed and when the synchronizing signal is received, until the power-supply switch is turned off, a battery saving timer 14 which generates a signal for battery saving control from the synchronizing pulse that is produced by the signal synchronizing circuit 11, and an alert tone generator circuit 15 which intermittently produces audible alert tone signals triggered by the signal detector circuit 12.

The display controller 4 comprises an I/O (input/output) port 16 which controls the input and output relative to the receiver unit 2 and the reception controller 3, a counter register unit 17 having an arithmetic logic unit, a counter unit and a register unit and serving as a heart of the CPU, a memory unit 18 which posesses a ROM area of $2k \times 8$ bits for storing the program and a RAM area which serves as a temporarily storing area, an I/O port 19 which reads the data from the P-ROM 8, and an I/O port 20 which produces the display data to the LCD controller/driver 5. Reference numeral 30 represents a common data bus.

The driver circuit 7 comprises a speaker drive circuit 21 which amplifies the alert tone signal generated by the alert tone generator circuit 15 to a level that drives the speaker 9, a power-supply switching circuit 22 which controls the power supply of the receiver unit 2 responsive to the operation of the battery saving timer 14, and a power-supply switching circuit 23 which controls the power supply of the display controller 4 responsive to the operation of the signal detector 12. The output of the driver circuit 7 may also be used as a power supply f for the display unit 6.

Next, the operation of the circuit of FIG. 3 will be described with reference to FIGS. 1 and 2. The digital signal a' received, demodulated and shaped for its waveform through the receiver unit 2, is sent to the signal synchronizing circuit 11, to the signal detector circuit 12, and to the I/O port 16. The signal synchronizing circuit 11 synchronizes and reproduces the pulse from the signal, and the thus reproduced and synchronized pulse is sent to the signal detector circuit 12 for detecting the call number, to the I/O port 16 of the display controller 4 for detecting the data of display, and to the battery saving timer 14 which generates a timing for saving the battery. The signal detector circuit 12 compares the call number of interest which has been stored in the register 13 with the received signal that is produced by the receiver circuit 2, and checks whether there is the call for the subject receiver. When the call number of interest is received, the power-supply switching circuit 23 is energized to supply the electric power to the display controller 4 and to the LCD controller/driver.

In the display controller 4, as the power-supply switching circuit 23 is energized, the display data succeeding the call number is received via the I/O port 16 responsive to the synchronizing pulse from the signal synchronizing circuit 11 and the received signal a' from the receiver unit 2. The received data is written in the RAM area being controlled by the counter register unit 17 (contents of control have been written as a program in the ROM area). Any error in the data is corrected by the counter register unit 17 according to a program stored in the memory unit 18. In the case of the key code system, the translated contents stored in the external P-ROM 8 are read out through the I/O port 19 using the program stored in the memory unit 18 and the counter register unit 17, based upon the corrected result. The thus read out result is then written in the RAM area of the memory unit 18.

The data of the display data set completion is sent to the signal detector circuit 12 via the I/O port 16 being controlled by the memory unit 13 and the counter register unit 17. When the completion data is not received by the signal detector circuit 12 even when a predetermined period of time (which is required for processing the display data, and which lasts about 1 second) has passed after the group of interest had been sent, the data for informing the reception stored in the signal detector circuit 12 is reset. This is because, the behavior of a called person is specified by the display data (such as telephone number of address), and a simple calling makes no sense.

On the other hand, when the completion data is sent from the display controller 4, the data of informing reception stored in the signal detector circuit 12 is sent to the alert tone generator circuit 15 when a predetermined perid of time has passed after the group of interest had been sent. The alert tone generator circuit 15 produces the signal of call alert tone from the previous data. The signal is amplified through the speaker drive circuit 21, and is sent to the speaker 9.

In the display controller 4, the display data is sent in a serial manner to the LCD controller/driver 5 via the I/O port 20 at the same timing (when a predetermined period of time has passed after the group of interest had been sent) according to the program in the ROM in the memory unit 18 being controlled by the counter register 17. In the LCD controller/driver 5, the display data which is received is decoded to directly drive the display unit 6. The call alert tone and the display of LCD are reset according to the program in the display controller 4 after a predetermined period of time (about 8 seconds) has passed. In this case, the call alert tone is reset by clearing the above-mentioned data of display data set completion.

As for the operation of saving battery, the power supply of the receiver unit 2 which is turned on before the group of interest is received, is turned off by the power-supply switching circuit 22 when the reception of the group of interest is finished being controlled by the battery saving timer 14. As mentioned already, furthermore, the power-supply switching circuit 23 which controls the power supply of the display controller 4 turns on the power supply only when the synchronizing signal is received by the signal detector circuit 12 and the call number of interest is received.

As described above, according to the present invention, continuous and parallel processing such as signal synchronization, signal reception and call alert tone generation are required. Accordingly, the block circuits of which the functions cannot be performed by the CPU are incorporated into the external dedicated LSI. Therefore, load to be exterted on the CPU can be reduced, and the processing for the display data can be reinforced correspondingly. Further, adaptability of the display data can be attained easily by changing the mask of ROM in the CPU and can, hence, easily meet the demands of the individual users.

According to the conventional art, the battery saving counter must be fed with the power supply at all times, entailing a problem of large current consumption. According to the present invention, however, the battery saving counter is incorporated into the external dedicated LSI. Therefore, the average current consumption in the overall receiver can be greatly reduced to extend the life of the battery.

What is claimed is:

1. A selective call receiver with display comprising:
   receiver means which receives electromagnetic waves and produces digital received signals;
   display means to display received data;
   display controller means for controlling said display means;
   memory means which stores call numbers;
   means responsive to a decoded signal to indicate the paging of the receiver;
   reception controller means powered by a power supply, said reception controller means, upon receipt of the digital received signals produced by the receiver means, generating synchronizing pulse signals and comparing said digital received signals with said call number to provide said decoded signal, said reception controller further generating timing signals for connecting and disconnecting the power supply from receiver means and said display controller means;
   first switching means which controls the connecting and disconnecting of the power supply to said receiver means in response to said timing signals; and
   second switching means which controls the connecting and disconnecting of the power supply to the display controller means in response to said synchronizing pulse signals.

2. A selective call receiver according to claim 1 wherein said reception controller means comprises a dedicated LSI and said display controller means comprises a one chip CPU.

* * * * *